(12) United States Patent
Allen

(10) Patent No.: US 8,074,536 B1
(45) Date of Patent: Dec. 13, 2011

(54) ANGLED WIRE STRIPPERS

(76) Inventor: Larry Allen, Morrisdale, PA (US)

( * ) Notice: Subject to any disclaimer, the term of this patent is extended or adjusted under 35 U.S.C. 154(b) by 129 days.

(21) Appl. No.: 12/381,834

(22) Filed: Mar. 17, 2009

(51) Int. Cl.
*H02G 1/12* (2006.01)
*B25F 1/04* (2006.01)
*B26B 27/00* (2006.01)

(52) U.S. Cl. ................................. 81/9.4; 7/107; 30/90.6

(58) Field of Classification Search ............. 81/9.4, 81/420, 424.5, 489; 7/107; 30/90.6, 90.1; D8/58
See application file for complete search history.

(56) References Cited

U.S. PATENT DOCUMENTS

| | | | | |
|---|---|---|---|---|
| 776,879 | A | * | 12/1904 | Wolfe ............................... 7/107 |
| 2,819,520 | A | * | 1/1958 | Eyles ............................. 30/90.8 |
| 3,177,741 | A | | 4/1965 | DeBruin |
| 3,221,576 | A | | 12/1965 | Goetz |
| 3,872,746 | A | * | 3/1975 | Wittes et al. .................... 30/90.1 |
| 4,162,638 | A | * | 7/1979 | McCord ......................... 30/90.1 |
| 4,395,928 | A | | 8/1983 | Undin et al. |
| D285,527 | S | | 9/1986 | Schwartz |
| 4,934,024 | A | * | 6/1990 | Sexton ............................ 16/421 |
| 5,323,502 | A | * | 6/1994 | Miller .............................. 7/107 |
| 5,497,522 | A | * | 3/1996 | Chen ................................ 7/128 |
| 5,669,132 | A | * | 9/1997 | Brimmer ...................... 29/426.4 |
| 5,724,688 | A | * | 3/1998 | Chen ................................ 7/128 |
| 6,079,296 | A | | 6/2000 | Muromoto |
| 6,148,483 | A | * | 11/2000 | DeGraff ......................... 16/430 |
| D458,827 | S | | 6/2002 | Liversidge |
| 6,502,310 | B1 | * | 1/2003 | Shaw ............................. 30/90.4 |
| 6,718,848 | B1 | | 4/2004 | Liversidge |
| 6,934,991 | B2 | | 8/2005 | Kinkade |
| 2005/0044715 | A1 | * | 3/2005 | Shutts et al. .................. 30/90.1 |

OTHER PUBLICATIONS

Bent-Nose Strippers. Klein-Kurve®. 2007 Klein Tools, Inc. Supplement G to Catalog 150.

* cited by examiner

*Primary Examiner* — David B Thomas
(74) *Attorney, Agent, or Firm* — Montgomery Patent & Design, LLC; Robert C. Montgomery; Joseph T. Yaksich

(57) ABSTRACT

A pair of wire strippers with a specially designed tip to allow stripping of type NM or NMC cable inside of electrical boxes is herein disclosed. The upper portion of the tip, is bent at a ninety degree (90°) angle to the main body of the stripper. This angled tip contains cutting blades designed to conform to the profile of type NM or NMC cable, commonly known as "Romex." Due to this angled configuration, the wire stripper blades can easily fit into small electrical boxes and strip cable near the back of the box, as opposed to conventional wire strippers which cannot be used in such close quarters. To aid in proper positioning of the tip of the wire stripper, a "Z"-shaped parallel offset is provided. The wire strippers can also be used outside of boxes in an equally effective manner, thus an electrician is not required to carry two (2) pairs of wire strippers.

13 Claims, 8 Drawing Sheets

ANGLED WIRE STRIPPERS

RELATED APPLICATIONS

The present invention was first described in a notarized Official Record of Invention on May 22, 2008, that is on file at the offices of Montgomery Patent and Design, LLC, the entire disclosures of which are incorporated herein by reference.

FIELD OF THE INVENTION

The present invention relates generally to a hand tool and, more particularly, to a manually operated wire stripping tool which combines functions not previously available.

BACKGROUND OF THE INVENTION

Anyone who performs laborious work will attest that nothing beats having the proper tool for a particular job. The proper tool can save time, save money, produce a higher quality job, reduces damage to equipment, and provides for the increased safety of a worker. Each field of the skilled trade has its own type of specialty tools, each performing a specialized task. Wire strippers are commonly used in the electrical field for stripping the outer sheath insulation off of type NM or NMC wire, commonly known as "Romex". Simple manual wire strippers operate using a pair of opposing blades much like wire cutter with a notch to cut the insulation without cutting the wire.

While these types of conventional wire strippers work great on wire when it is outside of electrical boxes or similar confined areas, the close confines on the interior of such boxes, coupled with the wire size, makes it difficult or impossible to strip the insulation form the electrical wire near the rear of the box. Electricians typically try using straight blade utility knives to cut the insulation and pull it from the wire. This action however subjects the internal conductors to possible damage and accidental shorting at a later date.

Various attempts have been made in the past to overcome these problems and provide a means of stripping insulation from electrical wires. Among the relevant attempts to address these problems are several U.S. patents, including U.S. Pat. Nos. 3,177,741; 3,221,576; 6,718,848.

U.S. Pat. No. 6,934,991, issued in the name of Kinkade, discloses a combination electrician's tool comprising a pair of pivotally connected pliers having a two (2) cutting jaws which are used for cutting items such as wire and act as a hammering tool when in a closed position.

U.S. Pat. No. 4,395,928, issued in the name of Undin et al., discloses a hand tool for automatically stripping insulation from the end of a wire comprising a pair of gripping jaws which provide a means of holding the wire and pair of cutting and stripping jaws which remove the insulation utilizing an actuating member and a driving member which drives the cutting and stripping jaws away from the gripping jaws.

U.S. Pat. No. 6,079,296, issued in the name of Muromoto, discloses a wire cover peeling tool comprising a gripped body, an operation lever, and clamp arm which are pivotally coupled to a receiving clamp. Two (2) sliding blades extend inwardly from the tip of the receiving clamp and provide a means of cutting a portion of the wire covering and extracting the covering from the wire core.

While these devices fulfill their respective, particular objective, each of these references suffers from one or more of the following disadvantages: comprising a large wire gripping and cutting and insulation extraction mechanism; causing problems such as damage to the wire core or to adjacent components; or requiring the electric wire to be bent, moved, or pulled from its original position in order to remove the insulation; thus none disclosed a solution to the aforementioned problems.

Additionally, ornamental designs for hand held cutting and stripping tools exist, particularly, U.S. Pat. Nos. D 285,527 and D 458,827. However, none of these designs are similar to the present invention.

Accordingly, there exists a need for an apparatus which provides a means by which type NM or NMC wire can be easily and safely stripped inside of electrical boxes. The development of the present invention fulfills this need.

SUMMARY OF THE INVENTION

In view of the foregoing references, the inventor recognized the aforementioned inherent disadvantages and observed that there is a need for an angled wire stripper having a simple mode of operation for use in any tight quarters and providing nearly flush operation with a back portion of an electrical box and thus, the object of the present invention is to solve the aforementioned disadvantages.

To achieve the above objective, it is the object of the present invention to provide a wire stripping apparatus with an angled tip which provides a means to remove insulation from or cut a wire or cable core within a confined space.

Another object of the present invention is to provide an apparatus comprising a two (2) pivotally connected body halves, two (2) upper functioning ends, a compression spring, a latching clasp, a plurality of stripping recesses, and a wire cutter.

Yet still another object of the present invention is to provide a two (2) body halves, each comprising an upper functioning end and a lower handle portion. The body halves are pivotally connected to one (1) another via a pivot pin extending through aligned holes in each body half and fastened.

Yet still another object of the present invention is to provide two (2) adjacent functioning ends comprising a lower portion having two (2) corresponding cutting blades, a cable stripping recess, and a plurality of variously sized wire stripping recesses in a parallel configuration to each body half and an upper portion comprising an offset "Z"-shape tip having two (2) consecutive opposing ninety degree (90°) bends and a cable and wire stripping recess in a perpendicular configuration to the body halves.

Yet another object of the present invention is to provide the functioning ends which provide a means for the cutting blades and stripping recesses to conform to the profile of common cable and wire. The angled configuration of the upper portion's tip enables the stripping recess to easily fit into any small electrical box and strip wire and cable near the back of the box.

Yet another object of the present invention is to provide a "Z"-shaped offset tip on the upper portion of the functional ends which enables proper positioning of the stripping recesses on the tip within a confined space and enables proper engagement of the handles while in use.

Yet still another object of the present invention is to provide a plurality of variously sized cable and wire stripping recesses comprising one-half (½) of a recess on each functional end which correspondingly engage around a diameter of cord or wire and cut and which are sized accordingly to only cut through the insulated sheathing and not damage the wire core.

Yet still another object of the present invention is to provide an ergonomic handle portion on each of the lower body halves which provide a comfortable and insulated means of gripping the apparatus.

Yet still another object of the present invention is to provide a compression spring which provides a means of resisting the compression of the two (2) handles as they approach one another thereby providing an expansion force and tending to separate the handles thereby improving the user's grip and opening the functioning ends for ease of insertion and removal of wire segments.

Yet still another object of the present invention is to provide a clasping mechanism which provides a means of locking the handle portions together thereby putting the apparatus in a closed compact state for storage.

Yet another object of the present invention is to provide an apparatus which can also be used outside of electrical boxes in an equally effective manner, thus an electrician is not required to carry two (2) pairs of wire strippers.

Yet still another object of the present invention is to provide a method for utilizing the angled wire strippers in a manner which is quick, easy, and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
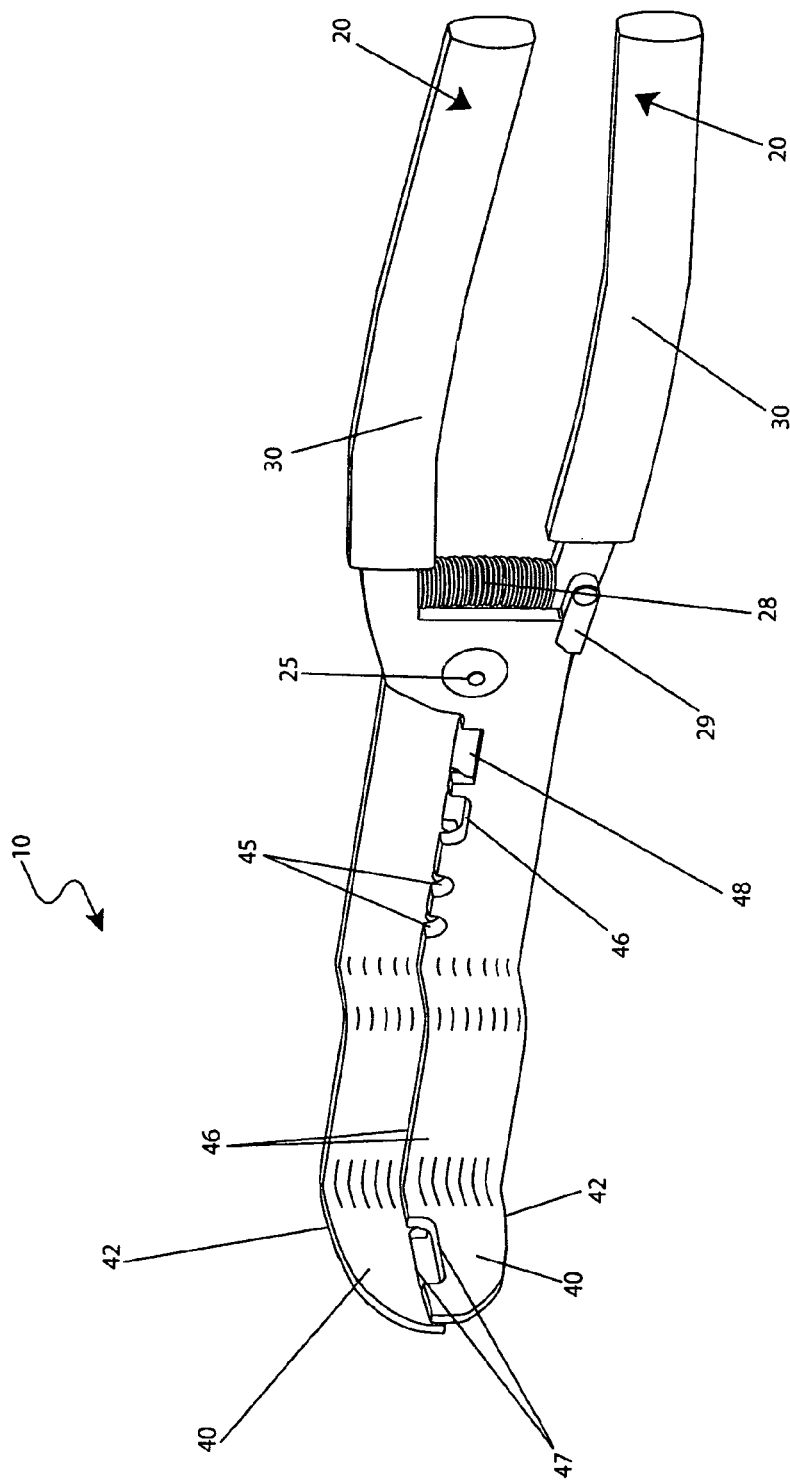
FIG. 1 is a perspective view of an angled wire stripper 10 with two (2) upper functioning ends 40 in a closed orientation, according to the preferred embodiment of the present invention.

DESCRIPTIVE KEY 10 angled wire strippers
20 body half
25 pivot pin
28 spring
29 clasp
35 handle
40 upper functioning end
42 upper surface
43 inner engagement surface
45 wire stripping recess
46 first cable sheath stripping recess
47 second cable sheath stripping recess
48 straight wire cutter

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for removing insulation therefrom a wire, preferably electrical, especially wire residing within a confined space such as an electrical box. The angled wire strippers (herein described as the "apparatus") 10 comprises two (2) body halves 20, two (2) upper functioning ends 40, and two (2) handles 35. The apparatus 10 is envisioned to be introduced in three (3) or more models comprising specific wire stripping features particularly corresponding to a single wire gauge (see FIG. 7 description). The body halves 20 and/or the upper functioning ends 40 would be formed of steel and/or other metals in a pressing or casting process. The handles 35 comprise a plastic or rubber covering applied thereto said body halves 20 at extremities opposite the upper functioning end portions 40 for comfort and electrical insulation thereof. In addition, the handle 35 is envisioned to be ergonomically designed to comprise curves to correspond with the silhouette of a human hand with the option of adding finger indentations (not pictured) therein. The apparatus 10 would be capable of being made in multiple sizes, styles, colors, and materials dependent on the type of wire to be stripped, the degree of confinement of where the wires are located, and the individual taste of the user.

Figure 2:
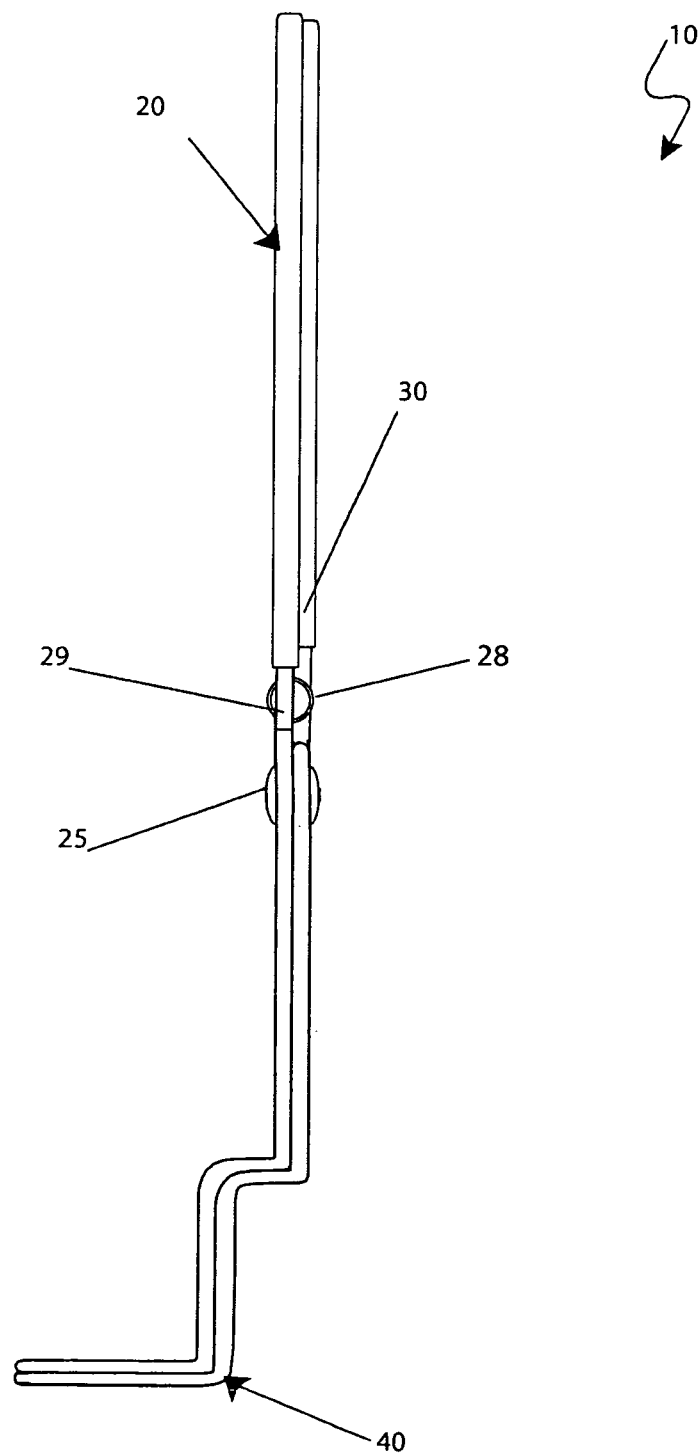
FIG. 2 is a side view of the angled wire stripper 10, according to the preferred embodiment of the present invention.

Referring now to FIGS. 1 and 2, perspective and side views of the apparatus 10 are herein disclosed in accordance to the preferred embodiment of the present invention. The apparatus 10 is envisioned to comprise two (2) body halves 20 that are pivotally connected therewith one (1) another via a pivot pin 25. The body of the apparatus 10 comprises a first body half 20 and a second body half 20 that are held in place via a pivotal pin 25 extending through aligned holes. Each body half 20 comprises an upper functioning end 40 further comprising an offset shape via two (2) consecutive opposing (90°) degree bends forming an offset "Z"-shape approximately one-quarter (¼) of an inch deep. Positioned at the distal end of each body half 20 prior to the pivot pin 25 is a handled portion 35, and positioned at the proximal end of each body half 20 following the pivot pin 25 is a fixed upper functioning end 40. The body halves 20 define a fixed upper functioning end 40 having an offset length being parallel therewith the longitudinal axis of said body half 20, and a perpendicular length at an extreme proximal end portion as can be seen in FIGS. 1 and 2. The pivot pin 25 provides a conventional reversing rotary device and further comprises additional standard and expected features such as, but not limited to: a jaw expanding compression spring 28 and a latching clasp 29. Said spring 28 provides an expanding force, thereby separating the handle portions 35 during use to improve gripping as well as opening the upper functioning ends 40 allowing easy insertion of wires therewithin. The clasp mechanism 29 provides a locking means thereto the apparatus 10 when in a closed state, thereby providing compact storage therewithin a toolbox or other storage place.

Figure 3:
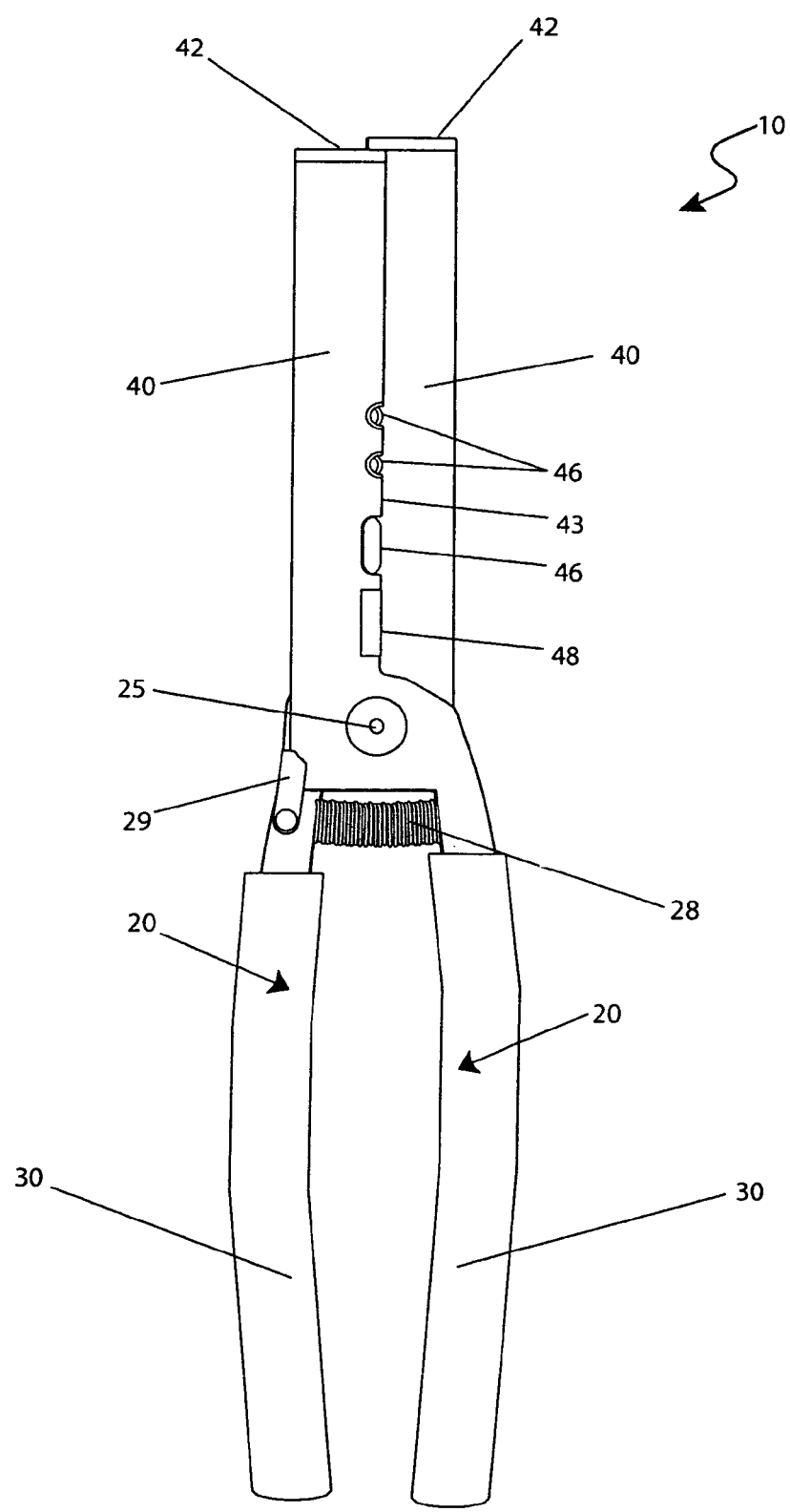
FIG. 3 is a forward view of the angled wire stripper 10, according to the preferred embodiment of the present invention.
Figure 4:
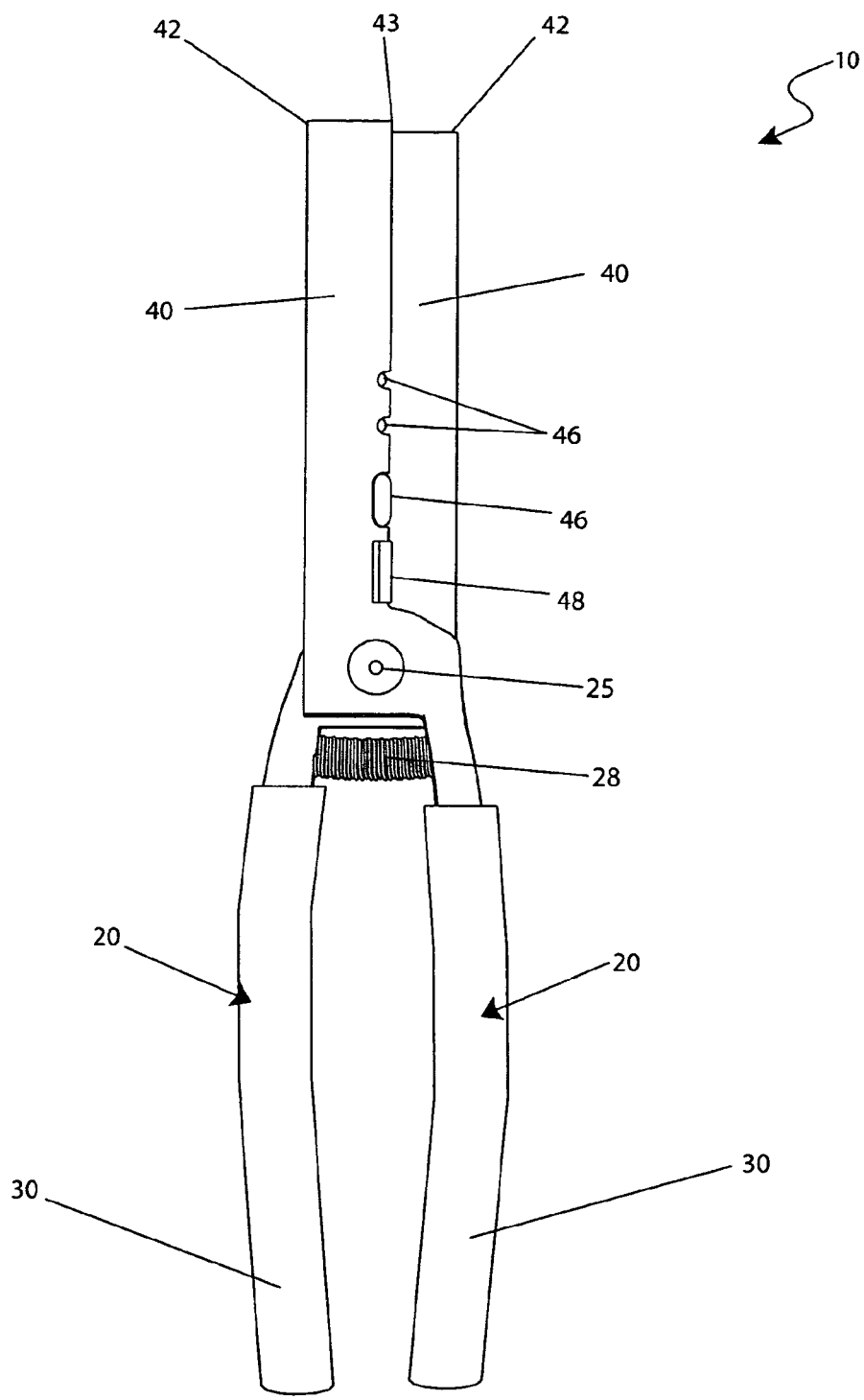
FIG. 4 is a rearward view of the angled wire stripper 10, according to the preferred embodiment of the present invention.

Referring now to FIGS. 3 and 4, forward and rearward views of the apparatus 10 are herein disclosed in accordance to the preferred embodiment of the present invention. Prior to the pivot pin 25 resides a curved handled portion 35 ergonomically designed to comfortably fit within the hand of a user and configured to permit easy manual gripping by a user and arranged for squeezing together. The handle 35 projects from each body half 20 in generally the same direction as the longitudinal axis of said body half 20 and is formed integrally with said body half 20. Further, the handle 35 comprises a covering of rubber, plastic, or the like to provide an electrical insulation thereby providing a degree of protection to the user.

Figure 5:
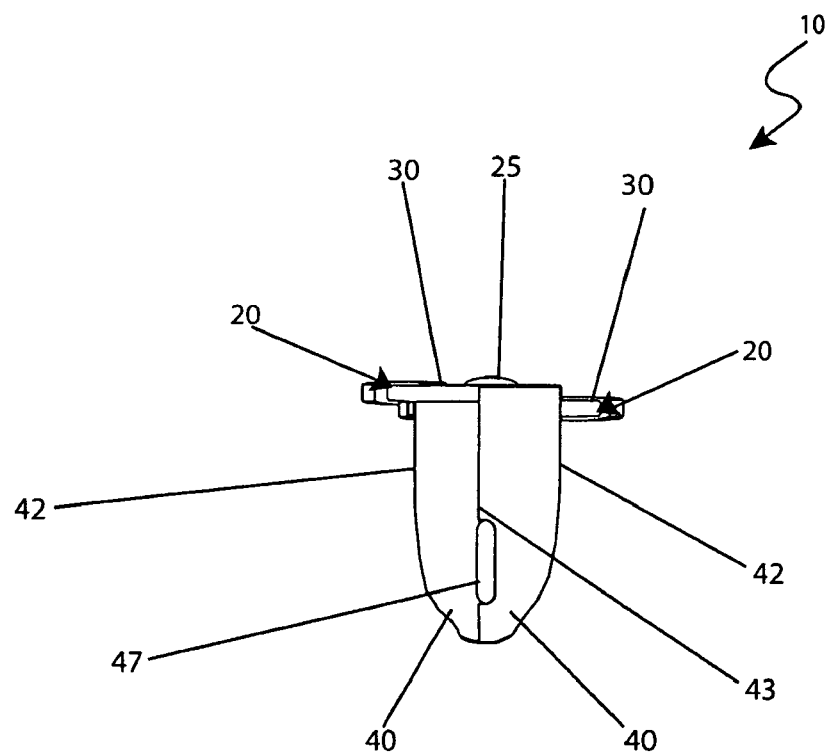
FIG. 5 is an upper view of the angled wire stripper 10, according to the preferred embodiment of the present invention.
Figure 6:
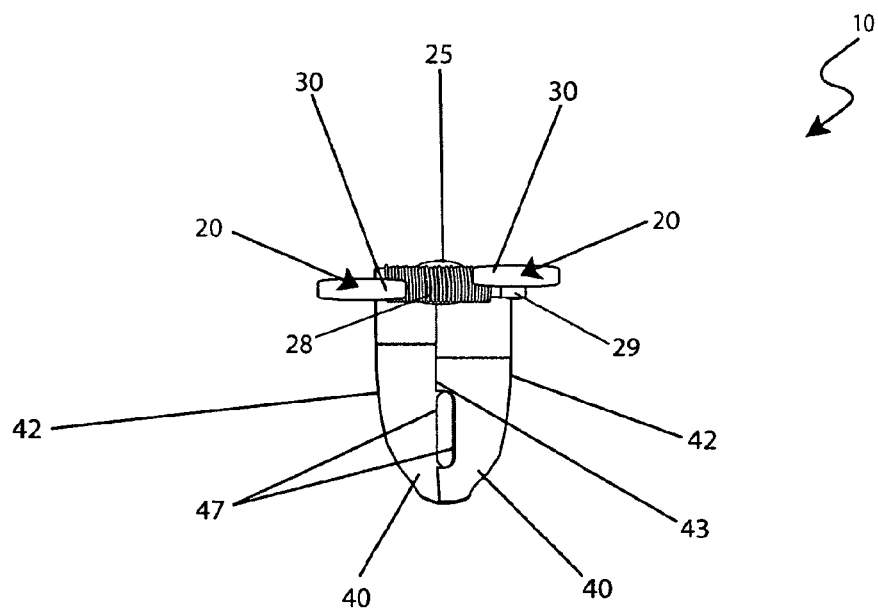
FIG. 6 is a bottom view of the angled wire stripper 10, according to the preferred embodiment of the present invention.

Referring now to FIGS. 5 and 6, top and bottom views of the apparatus 10, are herein disclosed in accordance to the preferred embodiment of the present invention. Perpendicularly disposed at each respective body half 20 are upper functioning ends 40 positioned at the proximal end of said body half 20. The upper functioning ends 40 are envisioned to extend a limited distance therefrom the uppermost end of each body half 20. The length of the upper functioning ends 40 is envisioned to be long enough to be capable of cutting and stripping wire cables and/or each respective wire residing therein whilst still be short enough to be capable of being inserted therein confined spaces, i.e. electric switch boxes. The angled design of the upper functioning ends 40 allows the user to cut and/or strip the wire cable and/or individual wires thereof, especially those that already reside therewithin a confined space, that would be typically difficult, if not impossible, to do with previous invention designs.

Figure 7:
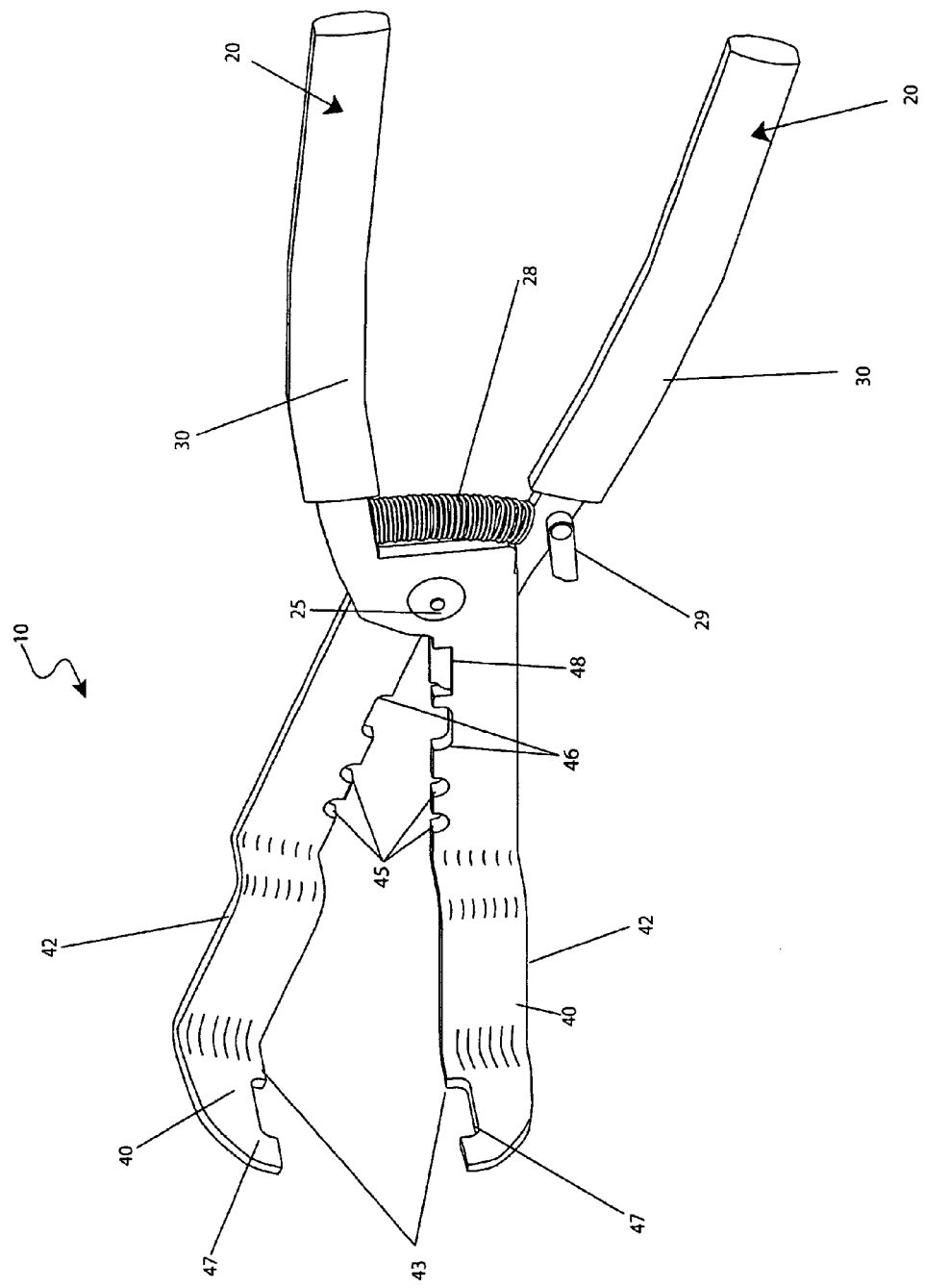
FIG. 7 is a perspective view of the angled wire stripper 10 with two (2) upper functioning ends 40 in an open orientation, according to the preferred embodiment of the present invention; and, FIG. 8 is a close-up perspective view of the two (2) upper functioning ends 40 in an open orientation, according to the preferred embodiment of the present invention.

Referring now to FIG. 7, a perspective view of the apparatus 10 with the two (2) upper functioning ends 40 in an open orientation is herein disclosed in accordance to the preferred embodiment of the present invention. Each upper functioning end 40 comprises an outer surface 42 and an inner engagement surface 43. Therebetween the inner 43 and outer 42 surfaces describe the thickness of the upper functioning end 40 which is envisioned to vary upon the wire size and the confined location of the wire. Let it be known that the terms "outer" and "inner" are being used just for better clarification and is not intended to limit the scope of the apparatus 10. The outer surface 42 of the upper functioning end 40 is herein referenced as being the surface at which faces away from the opposing upper functioning end 40. The inner surface 43 of the upper functioning end 40 is herein referenced as being the surface which faces towards the opposing upper functioning end 40. Consequently, when the handles 35 are forced inwardly upon receipt of user motion, the two (2) upper functioning ends 40 motion towards one (1) another until the two (2) engagement surfaces 43 contact one (1) another. The apparatus 10 is envisioned to be introduced in three (3) or more models each comprising an inner engagement surface 43 comprising a wire cutter 48, a first cable sheath stripper recess 46, a second cable sheath stripper recess 47, and a pair of wire stripping recesses 45. Said recesses 45, 46, 47 and wire cutter 48 portions correspond thereto a particular cable size and wire gauge. The wire cutter 48 comprises a conventional straight bladed cutter approximately one (1) inch wide located adjacent thereto the pivot pin 25, thereby providing maximum cutting leverage during use. Adjacent thereto the wire cutter 48 and toward the upper functioning end 40 is the first cable sheath stripper recess 46 which provides ovular-shaped corresponding openings particularly sized to receive and strip a sheath portion therefrom a standard multi-conductor cable such as, but not limited to a Romex type cable. Adjacent thereto said first cable sheath stripper recess 46, also toward the upper functioning end portion of the device 10, are a pair of standard wire stripper recesses 45 comprising corresponding semi-circular recess portions thereon opposing portions of the inner engagement surface 43 particularly sized so as to remove an insulation portion of a single wire. The second cable sheath stripping recess 47 provides similar cable sheath removal means as the aforementioned first cable sheath stripper recess 46 and is positioned along the angled portion of the upper functioning ends 40, thereby providing access thereto a cable therein an electrical box or other confined area. Once the two (2) upper functioning ends 40 are brought together, the two (2) engagement surfaces 43 are in a parallel arrangement therewith one (1) another.

Figure 8:
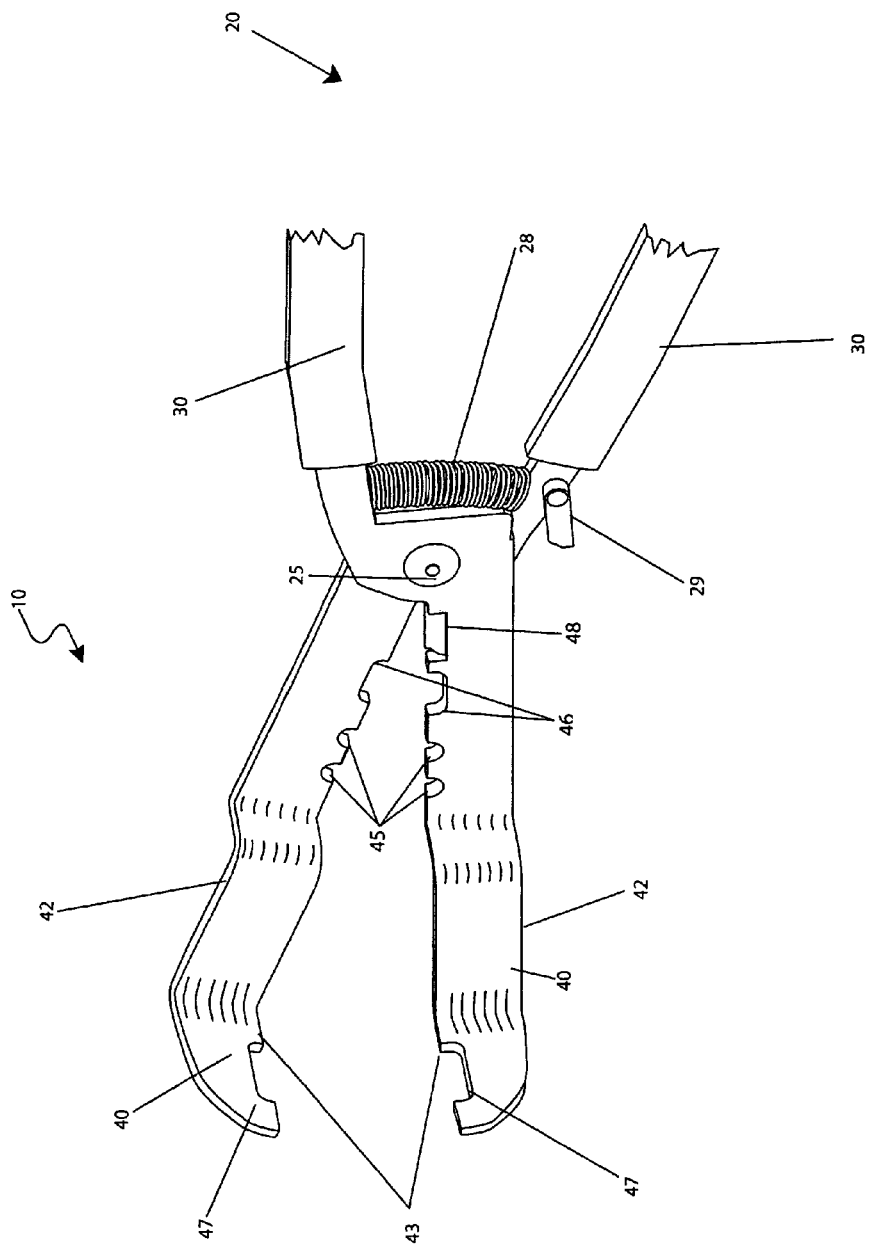

Referring now to FIG. 8, a close-up perspective view of the two (2) upper functioning ends 40 in an open orientation is herein disclosed in accordance with the preferred embodiment of the present invention. The stripping recesses 45, 46, 47 are disposed on the one (1) upper functioning end 40 cooperate with the opposing recesses 45, 46, 47 being disposed on the opposing upper functioning end 40, thereby producing an opening sized to receive the wire or cable to be stripped therein. While the handles 35 are biased outward upon receive of the user, and consequently the inner engagement surfaces 43 are extended away from one (1) another, the upper functioning ends 40 present a plurality of stripping recesses 45, 46, 47 formed that are sized and shaped to strip wire cables and wires of various dimensions, so that different wire diameters to be stripped may be accommodated. The cable sheath stripper recesses 46, 47 are firstly envisioned to be capable of removing the outer insulation of an electrical cable such as ROMEX thereby exposing the individual wires residing therein. Secondly, it is envisioned that there be additional wire stripping recesses 45 sized and shaped to strip the outer insulation therefrom each wire of various gauges thereby exposing the inner metallic core, i.e. copper.

It is envisioned that a first cutting process using the first cable sheath stripper recess 46 thereat a proximal location or the second cable sheath stripping recess 47 positioned on the distal end of the inner engagement surface 43 of each upper functioning end 40, be utilized to strip the outer insulation from the wire cable thereby exposing the wires therewithin. Following this action, a second cutting process is accomplished using the wire stripping recesses 45 positioned on the proximal end of the inner engagement surface 43 of each upper functioning end 40, to strip each individual wire's insulation. Forcing the body halves 20 towards one (1) another, via squeezing the handles 30, will force the upper functioning ends 40 together thereby engaging the stripping recesses 45, 46, 47 on the respective cable or wire. Once this action has taken place, the apparatus 10 may then be pulled in a parallel arrangement therewith the longitudinal axis of the body halves 20 to strip the insulation therefrom said cable or wire.

The preferred embodiment of the present invention can be utilized by the common user in a simple and effortless manner with little or no training. After initial purchase or acquisition of the apparatus 10, it would be configured as indicated in FIGS. 1 through 8.

The method of utilizing the apparatus 10 may be achieved by performing the following steps: releasing the clasp 29, thereby expanding the handles 35 apart; developing an opening defined between the engagement surfaces 43 of each upper functioning end 40; utilizing the first cable sheath stripping recess 46 in an unconfined area, if available, by squeezing the handles 35 together thereby closing the opening around said wire cable; utilizing said first cable sheath stripping recess 46 to cut through the outer insulation of the wire cable; pulling the apparatus 10 in a perpendicular arrangement therewith the longitudinal axis of the body halves 20 thereby stripping said outer insulation thereby exposing the individual wires residing therein; expanding the handles 35, thereby developing an opening defined between the engagement surfaces 43 of each upper functioning end 40; utilizing the second cable stripping recess 47 by inserting said upper functioning ends 40 therewithin a confined space, i.e. electrical switch box; surrounding the wire cable with the second cable stripping recess 47 to remove said cable insulating sheath; pulling the apparatus 10 in a parallel arrangement therewith the longitudinal axis of the body halves 20 thereby stripping said outer insulation in like manner as the previously described first cable sheath stripping recess 46; utilizing the wire stripping recesses 45 to surround an individual wire with the wire stripping recesses 45; squeezing the handles 35 together thereby closing the opening around said wire; utilizing said stripping recesses 45 to cut through the outer insulation of the wire; pulling the apparatus 10 in a perpendicular arrangement therewith the longitudinal axis of the body halves 20 thereby stripping said wire insulation; and, removing the wire insulation.

The apparatus 10 discloses a pair of wire strippers with specially designed upper function ends 40 that may be inserted therein confined spaces, i.e. electric switch box, to allow stripping of type NM or NMC cable and/or individual wires thereby allowing the user to utilize only one (1) tool to perform multiple wire stripping functions. Let it be known that the apparatus 10 may also be used on exposed wire cables and/or wires as well as wire cables and/or wires that reside in confined spaces.

The upper functioning ends 40 comprises stripping recesses 45, 46, 47 designed to conform to the profile of type NM or NMC cable and wires of various dimensions and shapes. The upper functioning ends 40 comprise a parallel and a perpendicular length coupled thereto the body halves 20. Consequently, when the handles 35 are biased open via the spring 28, the upper functioning ends 40 move away from each other, thereby providing an opening between the two (2) engagement surfaces 43 of said upper functioning ends 40. The perpendicular portion of each upper functioning end 40 makes the apparatus 10 ergonomically useful in confined spaces.

Spaced thereon the engagement surfaces 43 of the upper functioning ends 40 are cable stripping recesses 46, 47 sized and shaped to cut through the wire cable while not harming the wires residing therein. Further, wire stripping recesses 45 are also incorporated thereon the engagement surfaces 43 of the upper functioning ends 40 to cut through the wiring insulation while not harming the wire core residing therein.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:
1. An angled wire stripper apparatus, comprising:
   a first body half comprising a first lower end and a first "Z"-shaped offset section terminating in a first upper functioning end;
   a second body half pivotally connected thereto said first body half, said second body half comprising a second lower end and a second "Z"-shaped offset section terminating in a second upper functioning end;
   a plurality of pairs of wire stripping recess halves located along both said first body half and said second body half at said first lower end and said second lower end, respectively, and oriented perpendicular to a longitudinal axis along said apparatus;
   a pair of first cable sheath stripper recess halves located on said first body half and said second body half, positioned adjacent to said plurality of pairs of wire stripping recesses, and oriented perpendicular to said longitudinal axis along said apparatus;
   a pair of second cable sheath stripper recess halves located on said first upper functioning end and said second upper functioning end and oriented parallel to said longitudinal axis along said apparatus;
   a first handle connected thereto a distal end of said first body half; and,
   a second handle connected thereto a distal end of said second body half;
   wherein said plurality of pairs of wire stripping recess halves each form a plurality of wire stripping recesses when said first body half and said second body half are biased toward each other;
   wherein said pair of first cable sheath stripper recess halves form a first cable sheath stripper recess when said first body half and said second body half are biased toward each other;
   wherein said pair of second cable sheath stripper recess halves form a second cable sheath stripper recess when said first body half and said second body half are biased toward each other;
   wherein said first upper functioning end and said second upper functioning end allows a user a means to cut or strip a plurality of wire cables in a confined space; and,
   wherein a distal-most end of said first upper functioning end overlaps a distal-most end of said second upper functioning end when said first and second handles are squeezed together.
2. The apparatus of claim 1, wherein said second body half is pivotally connected thereto said first body half via a pivot pin.
3. The apparatus of claim 2, wherein said pivot pin provides a reversing rotary device.
4. The apparatus of claim 1, wherein said apparatus further comprises a jaw expanding compression spring, thereby providing an expanding force and separating said first handle therefrom said second handle during use.

5. The apparatus of claim 1, wherein said apparatus further comprises a latching clasp, thereby providing a locking means thereto said apparatus.

6. The apparatus of claim 1, wherein said first handle and said second handle comprise a curved handled portion.

7. The apparatus of claim 1, wherein said first body half and said second body half comprise steel.

8. The apparatus of claim 1, wherein said first upper functioning end and said second upper functioning end comprise steel.

9. The apparatus of claim 1, wherein said first handle and said second handle comprise a rubber covering.

10. The apparatus of claim 1, wherein said first handle and said second handle comprise a plastic covering.

11. The apparatus of claim 1, wherein said first handle and said second handle comprise an ergonomical design.

12. The apparatus of claim 1, wherein said apparatus further comprises a wire cutter.

13. A method for using an angled wire stripper apparatus, said method comprising the steps of:

provides said apparatus, comprising:

a first body half comprising a first lower end and a first "Z"-shaped offset section terminating in a first upper functioning end;

a second body half pivotally connected thereto said first body half, said second body half comprising a second lower end and a second "Z"-shaped offset section terminating in a second upper functioning end;

a plurality of pairs of wire stripping recess halves located along both said first body half and said second body half at said first lower end and said second lower end, respectively, and oriented perpendicular to a longitudinal axis along said apparatus;

a pair of first cable sheath stripper recess halves located on said first body half and said second body half, positioned adjacent to said plurality of pairs of wire stripping recesses, and oriented perpendicular to said longitudinal axis along said apparatus;

a pair of second cable sheath stripper recess halves located on said first upper functioning end and said second upper functioning end and oriented parallel to said longitudinal axis along said apparatus;

a first handle connected thereto a distal end of said first body half; and, a second handle connected thereto a distal end of said second body half;

wherein said plurality of pairs of wire stripping recess halves each form a plurality of wire stripping recesses when said first body half and said second body half are biased toward each other;

wherein said pair of first cable sheath stripper recess halves form a first cable sheath stripper recess when said first body half and said second body half are biased toward each other;

wherein said pair of second cable sheath stripper recess halves form a second cable sheath stripper recess when said first body half and said second body half are biased toward each other;

wherein said first upper functioning end and said second upper functioning end allows a user a means to cut or strip a plurality of wire cables in a confined space more easily;

releasing a clasp, thereby expanding said first handle and said second handle apart from each other;

developing an opening defined between engagement surfaces of said first upper functioning end and said second upper functioning end;

utilizing said first cable sheath stripping recess in an unconfined area, if available, by squeezing said first handle together therewith said second handle, thereby closing said opening around said wire cable;

utilizing said first cable sheath stripping recess to cut through an outer insulation of said wire cable;

pulling said apparatus in a perpendicular arrangement therewith said longitudinal axis of said first body half and said second body half, thereby stripping said outer insulation thereby exposing individual wires residing therein;

expanding said first handle and said second handle, thereby developing an opening defined between said engagement surfaces of said first upper functioning end and said second upper functioning end;

utilizing said second cable stripping recess by inserting said first upper functioning end and said second upper functioning end therewithin said confined space;

surrounding said wire cable with said second cable stripping recess to remove said cable insulating sheath;

pulling said apparatus in a parallel arrangement therewith said longitudinal axis of said first body half and said second body half, thereby stripping said outer insulation;

utilizing said first cable stripping recess and said second cable stripping recess to surround an individual wire;

squeezing said first handle and said second handle together, thereby closing said opening around said individual wire;

utilizing said first cable stripping recess and said second cable stripping recess to cut through said outer insulation of said individual wire;

pulling said apparatus in a perpendicular arrangement therewith said longitudinal axis of said first body half and said second body half, thereby stripping said wire insulation; and, removing said wire insulation.

* * * * *